Patented June 9, 1942

2,285,416

UNITED STATES PATENT OFFICE 2,285,416

COUMARONE-INDENE RESIN

Frank W. Corkery, Crafton, and Ralph H. Bailey, Clairton, Pa., assignors to Pennsylvania Industrial Chemical Corporation, a corporation of Pennsylvania No Drawing. Application November 25, 1938, Serial No. 242,277

8 Claims. (Cl. 260—81)

This invention relates to the production of a coumarone-indene resin of altered qualities.

Coumarone-indene resin, produced by the polymerization of coumarone and indene occurring in crude heavy solvent naphtha and other coal-derived liquids, is the resin most commonly associated with a plasticizer, such as a gelled oil, or pitch, to form the binder composition of mastic tile. It has been generally accepted that in such binder composition the plasticizer component contributes the quality of penetration at normal atmospheric temperatures, while the resin contributes thermoplasticity and load sustaining qualities.

It has been generally accepted in the industry that the qualities of the resin were to be taken as standardized, and that a desirable rate of penetration in the tile binder was to be approximated by the stage of gelation possessed by the plasticizer component of the binder.

We have discovered that the stage of polymerization of the coumarone-indene resin included in the binder composition has an important bearing upon the rate of penetration of the composition, and have provided procedure selectively to provide coumarone-indene resin which, when mixed with the plasticizing material, will give a binder composition for inclusion in mastic tile, and the like, which tends to impart to the tile both a desirable rate of penetration and a desirable penetration and elasticity at normal atmospheric temperature.

In order that our invention, and its utilization, may be made clear, we shall now briefly discuss the molecular stages in which coumarone and indene resins commonly are made, and the qualities which attend these several stages. In so doing, we may, with propriety, consider coumarone and indene as if they constitute but one substance. This may properly be done since, throughout the range of their associated polymerization, coumarone and indene polymers are not readily distinguishable as to boiling point, melting point, and other physical qualities.

To begin with, the coumarone and indene monomers are liquids boiling close together and included in solvent naphtha, within the range of 150° C. to 200° C. The coumarone-indene dipolymer, or dimer, is an oil boiling within the range of from about 300° C. to 360° C. The tripolymers, or trimers, of coumarone and indene occur as a solid substance having a melting point of approximately 75° C. (ball and ring method). In the usual recovery procedure for coumarone-indene resins a small but appreciable quantity of trimers is carried over in the "dipolymer oil" which consists chiefly of coumarone and indene dimers. The coumarone and indene tetramers occur as a solid substance having a melting point of approximately 105° C. (ball and ring method). The coumarone and indene pentamers occur as a solid substance having a melting point of approximately 115° C. (ball and ring method). The coumarone and indene hexamers occur as a solid substance having a melting point of approximately 135° C. (ball and ring method). Coumarone and indene heptamers occur as a solid substance having a melting point of approximately 142° C. (ball and ring method). The coumarone and indene polymers in the eighth, ninth, and tenth stages of polymerization approach a melting point of about 175° C., taken by the ball and ring method, as a maximum. We have experienced such difficulty in separating these polymers in accordance with the individual stages of polymerization, that we have not empirically determined the individual melting point of each. In this connection we may state that the separation of the various stage polymers of coumarone and indene resin has been effected by us in accordance with a solvent separation method utilizing a liquid containing varied proportions of alcohol and acetone; followed by determination of the molecular weight of the fractions.

We may here note the fact, commonly observed by manufacturers of coumarone and indene resin, that the polymerizing reaction of coumarone and indene, as promoted by chemical catalysts such as sulphuric acid, is strongly exothermic; and that in proportion to the temperature surge produced by the reaction, there is a tendency to form the lower rather than the higher polymers. If then a polymerization reaction be conducted in accordance with standard commercial procedure at an initial exemplary temperature of —10° C., high stage polymers, such as these in the ninth, tenth and eleventh stages, are first formed, and as the temperature rises due to the progress of catalytically stimulated polymerization, progressively lower polymers are produced. Thus with a starting temperature of —10° C., and with a final temperature of 35° C., some polymers of all stages from about the tenth stage down to the dipolymer stage are included in the resultant resin. In a normally conducted catalytically stimulated polymerization of coumarone and indene in bulk, the mechanism of polymerization thus runs a considerable gamut, and every grade of coumarone-indene resin as commonly produced and sold, contains coumarone and indene polymers in several stages of polymerization.

We have found that it is due to this lack of uniformity in polymer size of coumarone and indene resin, that such resin, as previously furnished for use in a tile binder, has not served to impart to the binder composition a desirably low rate of penetration at normal atmospheric temperatures. In recognizing this fact, we have discovered that in any given proportion of coumarone-indene resin with a given gelled oil or pitch, the rate of penetration, or more properly the rate of indentation at normal atmospheric temperatures, is dependent upon the proportioning of the higher polymers to the lower polymers in the resin. While there is no theoretical line of demarcation to define which polymers are to be considered "higher" and which "lower," it is a general fact that those polymers which are below the sixth stage of polymerization do but little to decrease the rate of indentation of a tile binder composition below that of the gelled oil or pitch component of the composition. While the sixth stage polymers are, for such purpose, on the dividing line, they are to be classed with the lower polymers rather than with the higher polymers.

Taking such dividing line between higher and lower polymers of coumarone and indene resin, so as to classify the polymers in higher than the sixth stage of polymerization as "high" polymers and those from the sixth stage downwardly as "low" polymers, the average commercial coumarone-indene resin contains about 10% of the high polymers and 90% of the low polymers. The best coumarone-indene resin previously available commercially for inclusion in mastic tile, contains about 30% of the high polymers and 70% of the low polymers. Therefore, a tile binder composition in which it is included has a sure that the tile meets the arbitrary test for relatively high rate of indentation; and to be sure that the tile meets the arbitrary test for usable low rate of indentation, the tile must contain a high proportion of pigment with respect to the binder composition. This gives an undesirably hard tile. Save only by accident, this rate of indentation does not follow the melting point of the resin, since for example, if a resin should consist wholly of polymers in the fifth stage, it would not, in spite of its melting point of 115° C., tend to give a tile binder favorable to a desirably low rate of penetration in the tile.

We may state generally that the coumarone-indene resin most suitable for use in the binder composition of mastic tile is, therefore, one which contains as high a proportion of the higher polymers as is consistent with elasticity in the tile. Coincidently with the fact that a high melting point of coumarone-indene resin does not necessarily indicate a resin having a desirable proportion of higher polymers, average molecular weight of the resin similarly, considered alone, does not so indicate. We may give as a critical consideration that, in the resin, polymers higher than those in the sixth stage of polymerization should constitute at least 40% the weight of the resin. Taking this proportion as a starting point, the resin becomes increasingly desirable for its intended purpose when the proportion of higher polymers in the resin is increased at the expense of the lower polymers therein; provided that the melting point of the resin is not thereby so increased as adversely to affect the elasticity of a binder composition in which the resin is included. Thus, we have found that if a coumarone-indene resin be composed of 60% of polymers in, for example, the seventh, eighth, ninth and tenth stages of polymerization, and 40% of polymers in, for example, the third, fourth, fifth, and sixth stages of polymerization, it will unduly decrease the elasticity of a tile in which it is included. This is because it has a high melting point, i. e. about 135° C. (ball and ring).

Ideal molecular conditions are attained when a high proportion of the higher polymers, such as those in the seventh, eighth, ninth, and tenth stages of polymerization, are plasticized by association with a relatively small content of the lowest polymers, that is, the dipolymers and trimers. An excellent coumarone-indene tile resin thus contains about 70% to 75% of the higher polymers and about 25% to 30% of the lower polymers, the latter consisting preponderantly of dimers and trimers.

We shall now describe a simple method for obtaining a coumarone-indene resin proportioned desirably for inclusion in a binder composition for mastic tile. An example of such procedure may be given as follows:

Taking 250 pounds of coumarone-indene resin of average commercial production, and having a melting point of about 115° C. (ball and ring method), the resin was dissolved in 600 pounds of mineral spirits with heat. It was then allowed to cool to a temperature of about 70° F., and a clear supernatant solution of coumarone-indene resin in the mineral spirits was decanted off from a precipitated mass of resin. The decanted solution weighed about 670 pounds, and contained the lower polymers, up to and largely including polymers in the sixth stage of polymerization. With the specific resin used, this resin content amounts to approximately 23% the weight of the decanted resin solution.

The precipitated resin had associated with it some solvent containing polymers in the same low stages of polymerization as those which were largely removed in solution, but otherwise consisted of polymers in higher than the sixth stage of polymerization. Upon distilling with heat and steam, the solvent was driven off from the precipitated body of resin, consisting preponderantly of the higher polymers.

We found that about 154 pounds of lower polymer resin was removed in the clear solution, leaving a precipitate, after distillation, of about 96 pounds. About 26 pounds of the precipitate consisted of lower polymers from the solution, and 70 pounds consisted of the higher polymers. The melting point of the total body of this initially precipitated resin was about 140° C. (ball and ring method). Before dissolving it, the starting resin had an average molecular weight of about 580; the average molecular weight of the resin recovered from the clear solution was about 400; and the average molecular weight of the precipitated resin was about 990.

A coumarone-indene resin, containing such a high proportion of the higher polymers is, in one particular, undesirable for inclusion in mastic tile, tending to make the tile too brittle, even when associated with gelled oil or plasticizing material, such as pitch in as great proportion of the latter as might be included in the binder without giving too high penetration at elevated temperature. For this reason we added to the 96 pounds of precipitated resin 16 pounds of dipolymer oil, as a plasticizer, giving a resin having a melting point of about 110° C. (ball and ring method), and a molecular weight of about 780.

Whereas neither melting point alone, nor molecular weight alone indicates that a coumarone-indene resin has the most desirable polymer organization for inclusion in a tile binder, adequate elasticity and avoidance of brittleness in the tile requires that the resin should associate with its high content of higher polymers a melting point below 120° C. We may give as the limits of what we consider a satisfactory tile resin one which has a melting point below 120° C. (ball and ring) coupled with a molecular weight no lower than 700. That resin is, however, so close to the border line that it is possible to meet the definition with a resin formed chiefly of sixth stage polymers. In order, therefore, that the definition be wholly accurate, it should include the further provision that the resin be composed to the extent of more than 40% its weight of polymers in higher than the sixth stage of polymerization, i. e. those we term the "higher" polymers. From that point, as the molecular weight of a resin is increased without increase in its melting point, or as the melting point of a resin is decreased without decrease in its molecular weight, a definition tends to become accurate, without reference to the proportion of the higher polymers. Thus as examples of such satisfactory resins, the one given above, coupling a molecular weight of about 780 with a melting point of about 110° C. (ball and ring) has more than 40% of its weight represented by the higher polymers.

An optimum example of our resin for mastic tile may be given as having a melting point between 85° C. and 100° C. (ball and ring method) and a molecular weight which approximates or exceeds 800. It will be readily understood that a resin coupling such low melting point with such high average molecular weight is obtainable by blending a large proportion of the high coumarone-indene polymers with a small proportion of the dimers and trimers of courmarone and indene. A procedure for obtaining a coumarone-indene tile resin having the optimum qualities, above described, for that purpose, is to follow generally the selective solvency method given above. Instead of allowing the initial resin solution to cool to about 70° F., in this modified procedure it was permitted to cool only to about 100° F. before decanting the clear solution from the precipitate. The precipitate was then redissolved in hot mineral spirits and allowed again to cool to 100° F., and the solution was again decanted. This precipitated resin consists only of those polymers of coumarone and indene which precipitate at relatively high temperature from aliphatic solvents, and thus consists almost exclusively of polymers in the eighth stage of polymerization, and stages higher than the eighth. When this high polymer resin was mixed with dipolymer oil in the proportion of 75% of the high polymer resin and 25% of the dipolymer oil, the product was a coumarone-indene resin having a melting point of about 90° C. (ball and ring method) and a molecular weight of approximately 850.

It has not been intended herein to give the impression that all polymers above those in the sixth stage of polymerization are of equal effect in decreasing the rate of penetration in a tile binder composition. That is not a fact, since we have found that, up to the limit of polymer size normally produced by commercial processes of producing resin by polymerization of coumarone and indene, progressively higher polymers have this tendency in progressively increasing order. It is a fact that below the seventh stage of polymerization the coumarone and indene polymers are ineffective in decreasing the rate of indentation in a binder composition for mastic tile in satisfactory order, and it is a coincidence that it is these polymers which remain in solution in mineral spirits at normal room temperature. Of these there is a tendency for the sixth stage polymer, having a cold test of 80° F. in mineral spirits with a kauri-butanol value of 35, to precipitate at normal room temperature.

We shall now discuss specifically the effect of the resins of different polymeric organization in a tile binder composition. In making tile, a resin and a plasticizer form the binder. The binder is usually composed of approximately 70% resin and 30% plasticizer, if the plasticizer is a gelled oil. The binder is usually composed of approximately 50% resin and 50% pitch, if the plasticizer is a pitch. A non-mineral pitch, which is the sort included in tile binders, is an impure form of gelled oil composed of gelled oil and containing considerable content of residual impurities. The binder is masticated on hot rolls with fillers and pigments, both of which, as is common, we generically group by the term "pigments," and the usual proportion of pigment to binder is 75% pigment to 25% binder for hard tile, and 65% pigment to 35% binder for soft tile. It is always desirable to include in the tile as high a proportion of binder as possible in order to have a tile of high wearing qualities and elasticity. It is possible to vary the initial indentation of the tile by varying the proportion of binder to pigment, a higher proportion of binder to pigment giving higher initial indentation. The amount of binder that can be used is, however, restricted by the type of resin associated with the component of the binder composition.

A resin of 110° C. melting point, composed of 90% lower polymers and 10% higher polymers, gives to standard tile a rate of penetration such that the penetration at 77° F. for ten minutes is double the penetration for one minute.

A resin composed of 70% lower polymers and 30% high polymers, and having a melting point of 110° C. is usable if the tile consists of more than 70% of pigment to 30% of binder, giving a rate of indentation such that the indentation at ten minutes is about 75% greater than the indentation for one minute. A resin having a melting point of 110° C. and consisting of 40% high polymers and 60% low polymers is usable within the limits of 25% to 35% binder in the tile, and gives a rate of penetration such that the penetration for ten minutes is about 50% greater than the penetration for one minute. A resin having a melting point of 110° C. and consisting of 60% high polymers and 40% low polymers is usable within a wide range of pigment-binder ratios, to give a tile in which the penetration for ten minutes is only approximately 25% greater than the penetration for one minute.

When the rate of indentation at 77° F. is low, it will be found that the indentation at 115° F. is satisfactory. It should be understood that it is standard practice to so make up a binder composition for mastic tile so that the tile has specified indentations at a temperature of 77° F. and at 115° F. determined in prescribed manner. The penetration, or indentation, data on tile given above was obtained by subjecting mastic tile to the standard mastic tile penetrometer. In testing for indentation data on binder compositions, we have employed the New York Testing Laboratory penetrometer, using the standardized procedure therefor.

We have herein described the pitch component associated with the resin in a binder composition for mastic tile as a pitch of non-mineral origin, by which there would be included animal, vegetable, and marine pitches. It is to be understood, however, that the pitch may very desirably be a synthetic pitch made by oxidizing together an oxidizable oil and still residue resulting from the purification and fractionation of light oil derived in the by-product coking of coal. This material, as well as gelled oil and the impure gelled oils known specifically as non-mineral "pitches," is included generically in the expression "plasticizer," or "plasticizing material," as used by us.

Throughout the specification we have spoken of a coumarone-indene resin, and a binder composition including the same as being "satisfactory" in mastic tile. This should be read with the understanding that coumarone-indene resin is in fact the resin which has before now been used preponderantly in tile of that sort, which tile is, however, a relatively new product, and susceptible of substantial improvement.

Beginning with the production of a coumarone-indene resin having improved qualities in mastic tile we have discovered fundamentally that in influencing rate of indentation the molecular weight of the polymers, individually considered, is the determining factor. For example a resin having an average molecular weight of 720 and a melting point of 115° C. (ball and ring), composed preponderantly of sixth stage polymers is unsatisfactory as a mastic tile resin. A resin, however, with an average molecular weight of 720, and a melting point of 115° C. (ball and ring) composed of 50% of polymers above the sixth stage and 50% of polymers below the sixth stage, is better for that purpose.

Carrying out this principle, the gist of the invention broadly considered is to provide a coumarone-indene resin in which there is marked interruption in the sequence of stages of polymerization represented by the polymers included in the resin. Regardless of the particular polymers represented in the resin, an intermediate interruption in the polymer sequence gives a tendency toward increased viscosity when the resin is rendered fluid by heat, and a tendency toward higher elasticity and lower thermoplasticity. Thus, by combining very high molecular weight polymers (such as those about the 20th stage of polymerization) with much lower molecular weight polymers (such as those in stages of polymerization up to, and even including, the sixth and seventh stages of polymerization, there is produced a coumarone-indene resin which may be used with a minimum of gelled oil to form the binder of mastic tile. Similarly by following this principle, a coumarone-indene resin may be produced which closely approaches the physical qualities of gelled oil; and by regulation of the size of the polymers, the extent to which the normal quality of thermoplasticity is retained and the abnormal quality of elasticity is increased may predictably be regulated.

For example, a normally produced grade of coumarone resin which has a melting point of approximately 110° C. will be composed of approximately 10% high polymers and 90% low polymers, and will have a viscosity at 350° F. for delivery of 50 cc. through a Saybolt-Furol tip of about 120 seconds. We have made resin with the same melting point but composed of 60% of low polymers and 40% of high polymers which have viscosities of 300 seconds under the same conditions. We have also made resins which are composed of about 65% very high polymers and 35% of low polymers and have viscosity of over 1000 seconds while retaining 110° C. melting point. By a double extraction we obtain extremely high polymers (i. e. polymers insoluble in mineral spirits below 140° F.—9th stage and upward), and plasticizing these with dimers, we have obtained resins with a melting point of 110° C. and having a viscosity at 350° F. so great that they could not be measured through the Saybolt-Furol viscosimeter. Thus it is apparent that it is possible to retain a definite melting point and cause considerable decrease in thermoplasticity and an increase in a gell-like nature. At the same time having extremely high polymers it is possible to use a large amount of dimers and trimers which are oil-like in nature and the plasticizing effect of the large amount included gives elasticity to the mixed resin. In each of the last noted altered resins, polymers in several of the stages of polymerization intermediate the highest and the lowest stages comprised in the resin, were in substantial entirety removed or were reduced to a minimum.

We claim as our invention:

1. The herein described coumarone-indene mastic tile resin having a preponderant content of penetration-resistant coumarone-indene polymers composed of at least seven monomeric units, a substantial content of plasticizing coumarone-indene dimers, and a negligible content of intermediate coumarone-indene polymers of insignificant penetration-resistant and plasticizing properties.

2. The herein described coumarone-indene mastic tile resin which consists in substantial entirety of a solution of coumarone and indene polymers in the seventh and higher stages of polymerization in coumarone-indene dimers.

3. The herein described coumarone-indene mastic tile resin having by virtue of the inclusion therein of a high content of high coumarone-indene polymers melting not substantially lower than 140° C. and a high content of remotely low coumarone-indene polymers melting not substantially higher than 75° C. the property of abnormally high viscosity when rendered fluid by heat in comparison with a coumarone-indene resin of equal melting point and lower average molecular weight containing a normally sequential succession of coumarone-indene polymers from the lowest to the highest polymers included therein.

4. The herein described coumarone-indene mastic tile resin having by virtue of the inclusion therein of a high content of high coumarone-indene polymers composed of at least seven monomeric units and a high content of the remotely low coumarone and indene dimers the property of abnormally high viscosity when rendered fluid by heat in comparison with a coumarone-indene resin of equal melting point and lower average molecular weight containing a normally sequential succession of coumarone-indene polymers from the lowest to the highest polymers included therein.

5. The herein described coumarone-indene mastic tile resin having by virtue of the inclusion therein of a high content of high coumarone-indene polymers composed of at least seven monomeric units and a high content of the remotely low dimers of coumarone and indene the properties of abnormally high elasticity and abnormally low thermoplasticity as compared with a coumarone-indene resin of equal melting point and lower average molecular weight containing a normally sequential succession of coumarone-indene polymers from the lowest to the highest polymers included therein.

6. A coumarone-indene mastic tile resin melting below 120° C. which is a coumarone-indene blend consisting in substantial entirety of coumarone and indene polymers melting not substantially higher than 75° C., and coumarone and indene polymers melting not substantially lower than 140° C., the said coumarone-indene blend consisting more than 40% of the above-designated higher melting polymers.

7. A coumarone-indene mastic tile resin which is a coumarone-indene blend consisting in substantial entirety of coumarone and indene polymers so high in molecular weight as to precipitate from mineral spirits at temperatures above 100° F., and coumarone and indene dimers.

8. A coumarone-indene mastic tile resin which is a coumarone-indene blend consisting in substantial entirety of coumarone and indene polymers so high in molecular weight as to precipitate from mineral spirits at temperatures above 100° F., and coumarone-indene polymers of such low molecular weight as to melt below 75° C.

FRANK W. CORKERY.
RALPH H. BAILEY.